United States Patent
Chien et al.

(10) Patent No.: US 10,291,932 B2
(45) Date of Patent: May 14, 2019

(54) METHOD AND APPARATUS FOR LOW COMPLEXITY QUARTER PEL GENERATION IN MOTION SEARCH

(71) Applicant: QUALCOMM Incorporated, San Diego, CA (US)

(72) Inventors: Wei-Jung Chien, San Diego, CA (US); Xianglin Wang, San Diego, CA (US); Xin Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 14/710,967

(22) Filed: May 13, 2015

(65) Prior Publication Data

US 2016/0261882 A1 Sep. 8, 2016

Related U.S. Application Data

(60) Provisional application No. 62/129,299, filed on Mar. 6, 2015.

(51) Int. Cl.
*H04N 19/523* (2014.01)
*H04N 19/105* (2014.01)
(Continued)

(52) U.S. Cl.
CPC ......... *H04N 19/523* (2014.11); *H04N 19/105* (2014.11); *H04N 19/117* (2014.11);
(Continued)

(58) Field of Classification Search
CPC .. H04N 19/523; H04N 19/105; H04N 19/117; H04N 19/176; H04N 19/182; H04N 19/59; H04N 19/90
(Continued)

(56) References Cited

U.S. PATENT DOCUMENTS 5,412,435 A * 5/1995 Nakajima ............ H04N 19/105
348/402.1
7,620,109 B2 11/2009 Srinivasan
(Continued)

FOREIGN PATENT DOCUMENTS

EP 0883301 A2 12/1998
EP 0899687 A1 3/1999

OTHER PUBLICATIONS

Chiu Y.J., et al., "CE1: Report of self derivation of motion estimation in TMuC 0.9", 95. MPEG Meeting; Jan. 24, 2011-Jan. 28, 2011; Daegu; (Motion Picture Expert Group or ISO/IEC JTC1/SC29/WG11), No. m18919, Jan. 21, 2011 (Jan. 21, 2011), pp. 1-14, XP030047488.
(Continued)

*Primary Examiner* — William C Vaughn, Jr.
*Assistant Examiner* — Jae N Noh
(74) *Attorney, Agent, or Firm* — Procopio, Cory, Hargreaves & Savitch LLP

(57) ABSTRACT

This disclosure provides systems and methods for low complexity quarter pel generation in motion search for video coding. The method can include storing full-pixel position information related to a plurality of rows of video information of a reference frame in a memory. The method can also include applying a vertical interpolation filter to the full-pixel position information for video information related to the reference frame to determine a first sub-pel position information. The method can also include applying a horizontal interpolation filter to the first sub-pel position information to determine a second sub-pel position information for the every other row of video data. The method can also include generating a syntax element indicating pixel motion of a current frame based on the first sub-pel position
(Continued)

information. The method can also include encoding a block based on the generated syntax element.

30 Claims, 6 Drawing Sheets

(51) Int. Cl.
*H04N 19/182* (2014.01)
*H04N 19/176* (2014.01)
*H04N 19/117* (2014.01)
*H04N 19/80* (2014.01)
*H04N 19/59* (2014.01)

(52) U.S. Cl.
CPC ......... *H04N 19/176* (2014.11); *H04N 19/182* (2014.11); *H04N 19/59* (2014.11); *H04N 19/80* (2014.11)

(58) Field of Classification Search
USPC .................................................. 375/240.16
See application file for complete search history.

(56) References Cited

U.S. PATENT DOCUMENTS

| | | | |
|---|---|---|---|
| 8,831,086 B2 | 9/2014 | Ye et al. | |
| 2003/0112864 A1* | 6/2003 | Karczewicz | G06T 3/4007 375/240.01 |
| 2005/0141615 A1 | 6/2005 | Kim | |
| 2012/0147967 A1 | 6/2012 | Panchal et al. | |
| 2013/0094582 A1 | 4/2013 | Wittmann et al. | |
| 2013/0251029 A1 | 9/2013 | Ikeda | |
| 2015/0063457 A1* | 3/2015 | Gamei | H04N 19/122 375/240.16 |
| 2017/0163999 A1* | 6/2017 | Li | H04N 19/52 |

OTHER PUBLICATIONS

Huang Y-W., et al., "Survey on Block Matching Motion Estimation Algorithms and Architectures with New Results," The Journal of VLSI Signal Processing, Kluwer Academic Publishers, BO, vol. 42 (3), Feb. 13, 2006, pp. 297-320, XP019410185, ISSN: 1573-109X, DOI: 10.1007/S11265-006-4190-4, p. 301, right-hand column; tables 1, 2.
International Search Report and Written Opinion—PCT/US2016/016325—ISA/EPO—dated May 6, 2016.
Karczewicz M., et al., "Interpolation solution with low encoder memory requirements and low decoder complexity", ITU—Telecommunications Standardization Sector Study Group 16 Question 6 Video Coding Experts Group (VCEG), VCEG-N31, Twelfth Meeting: Santa Barbara, Sep. 24-27, 2001.
Liu B., et al., "New Fast Algorithms for the Estimation of Block Motion Vectors," IEEE Transactions on Circuits and Systems for Video Technology, IEEE Service Center, Piscataway, NJ, US, vol. 3 (2), Apr. 1, 1993, pp. 148-157, XP000367179, ISSN: 1051-8215, DOI: 10.1109/76.212720 the whole document.
McCann K., et al., "High Efficiency Video Coding (HEVC) Test Model 16 (HM 16) Encoder Description," 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R1002, Oct. 14, 2014, XP030116689, Sections 4.43 and 7.5.2.2.3.
Sullivan G.J., et al., "Overview of the High Efficiency Video Coding (HEVC) Standard", IEEE Transactions on Circuits and Systems for Video Technology, Sep. 28, 2012, pp. 1-19, XP55045358, ISSN: 1051-8215, DOI:10.1109/TCSVT.2012.2221191.
Wiegand, T., et al., "WD3: Working Draft 3 of High-Efficiency Video Coding," Document JCTVC-E603, 5th Meeting: Geneva, CH, Mar. 16-23, 2011, 160 pages.

* cited by examiner

METHOD AND APPARATUS FOR LOW COMPLEXITY QUARTER PEL GENERATION IN MOTION SEARCH

CROSS REFERENCE TO RELATED APPLICATIONS

This application claims benefit to U.S. Provisional Application 62/129,299, entitled "METHOD AND APPARATUS FOR LOW COMPLEXITY QUARTER PEL GENERATION IN MOTION SEARCH," filed on Mar. 6, 2015, the entirety of which is hereby incorporated by reference herein.

BACKGROUND

Technological Field

This disclosure is related to the field of video coding and compression. In particular, it is related to motion estimation and motion compensation for High Efficiency Video Coding (HEVC).

Background

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding processes, such as those described in the standards defined by MPEG-2, MPEG-4, ITU-T H.263, ITU-T H.264/MPEG-4, Part 10, Advanced Video Coding (AVC), the HEVC standard presently under development, and extensions of such standards. The video devices may transmit, receive, encode, decode, and/or store digital video information more efficiently by implementing such types of video coding.

Video coding methods include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes systems and methods related to video coding. The systems, methods, and devices of this disclosure each have several innovative aspects, no single one of which is solely responsible for the desirable attributes disclosed herein.

One aspect of the disclosure provides a method for encoding video. The method can include storing full-pixel position information related to a plurality of rows of video information of a reference frame in a memory. The method can also include applying a vertical interpolation filter to the full-pixel position information for video information related to the reference frame to determine a first sub-pel position information when a searched position is not located on a full-pixel row within the reference frame. The method can also include storing the first sub-pel position information in the memory. The method can also include generating a syntax element indicating pixel motion of a current frame based on the first sub-pel position information. The method can also include encoding a block based on the generated syntax element.

Another aspect of the disclosure provides another method for encoding video. The method can include storing full-pixel position information related to a reference frame in a memory. When a searched position is not located on a full-pixel row within the reference frame, the method can also include applying a vertical interpolation filter to the full-pixel position information for every other row of video information related to the reference frame to determine a first sub-pel position information. The method can also include storing the first sub-pel position information in the memory. When a searched position is not located on a full-pixel column within the reference frame, the method can also include applying a horizontal interpolation filter to the full-pixel position information and the first sub-pel position information to determine a second sub-pel position information for the every other line of video information. The method can also include generating a syntax element indicating pixel motion of a current frame based on the full-pixel position information, the first sub-pel position information, and the second sub-pel position information. The method can also include encoding a block based on the generated syntax element.

Another aspect of the disclosure provides a device for encoding video. The device can have a memory configured to store full-pixel position information related to a series of frames in a memory for motion search. The device can also have a processor operably coupled to the memory. When a searched position is not located on a full-pixel row of a reference frame, the processor can apply a vertical interpolation filter to the full-pixel position information for video information related to the series of frames to determine a first sub-pel position information for the every other row of video information. The processor can also store the first sub-pel position information in the memory with the same precision as full-pixel position information. When a searched position is not located on a full-pixel column of the reference frame, the processor can apply a horizontal interpolation filter to the full-pixel position information and the first sub-pel position information to determine a second sub-pel position information for the every other line of video information. The processor can also generate a syntax element indicating pixel motion of the series of frames based on the full-pixel position information, the first sub-pel position information and second sub-pel position information. The processor can also encode a block based on the generated syntax element.

Another aspect of the disclosure provides an apparatus for encoding video data. The apparatus can have a storage means configured to store full-pixel position information related to a series of frames in a memory for motion search. The apparatus can also have a processing means operably coupled to the storage means. The processing means can apply a vertical interpolation filter to the full-pixel position information when a searched position is not located on a full-pixel row of a reference frame, to determine a first sub-pixel position information for every other line of video information related to the series of frames. The processing means can also store the first sub-pel position information in the memory with the same precision as full-pixel position information. The processing means can also apply a horizontal interpolation filter to the full-pixel position information and the first sub-pel position information when a searched position is not located on a full-pixel column of the reference frame, to determine a second sub-pel position information for the every other line of video information. The apparatus can also have a generation means for generating a syntax element indicating pixel motion of the series of frames based on the full-pixel position information, first and second half-pixel position information, or first and second quarter-pixel position information. The apparatus can also have an encoding means configured to encode a block based on the generated syntax element.

Other features and advantages of the present disclosure should be apparent from the following description which illustrates, by way of example, aspects of the disclosure.

DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
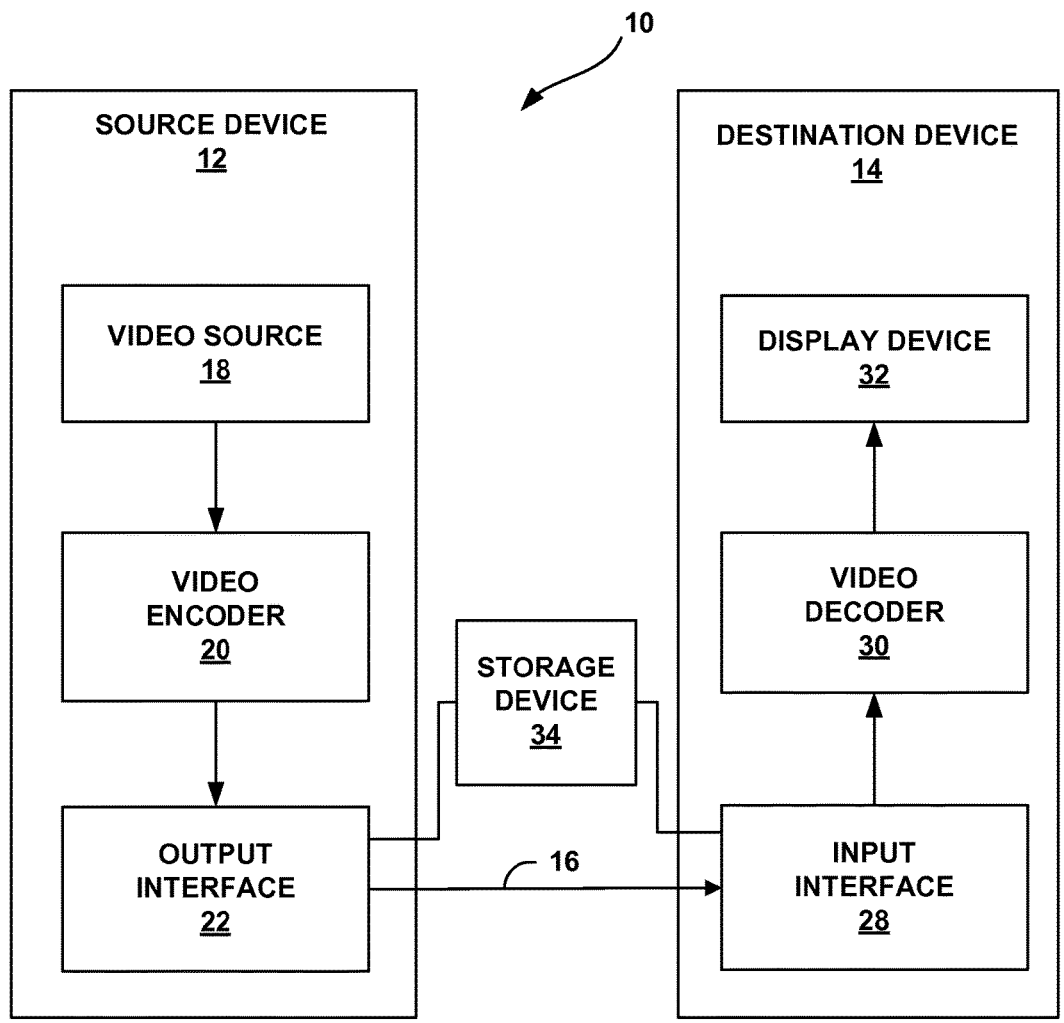
FIG. 1 is a functional block diagram of a video coding system.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. One or more of these standards can be used with the embodiments described herein.

In addition, High Efficiency Video Coding (HEVC) has been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as "HEVC WD" hereinafter, is available from http://phenix.int-evry.fr/jct/doc_end_user/documents/15_Geneva/wg11/JCTVC-O1003-v1.zip. The multi-view extension to HEVC, namely MV-HEVC, and another HEVC extension for more advanced 3D video coding (3D-HEVC) are being developed by the JCT-3V, and meanwhile, the scalable video coding extension to HEVC, namely SHVC, is being developed by the JCT-VC. A recent Working Draft (WD) of MV-HEVC, referred to as MV-HEVC WD5 hereinafter, is available from http://phenix.it-sudparis.eu/jct2/doc_en-d_user/documents/6_Geneva/wg11/JCT3V-F1004-v6.zip. The latest WD of 3D-HEVC, referred to as 3D-HEVC WD1 hereinafter, is available from http://phenix.it-sudparis.eu/jct2/doc_end_user/documents/6_Geneva/wg11/JCT3V-F1001-v3.zip. A recent Working Draft (WD) of SHVC and referred to as SHVC WD3 hereinafter, is available from http://phenix.it-sudparis.eu/jct/doc_end_user/documents/15_Geneva/wg11/JCTVC-O1008-v3.zip.

HEVC can generally reduce bitrate requirements by half with comparable image quality, at the expense of increased computational complexity. In some embodiments, HEVC encoders can trade off computational complexity, compression rate, robustness to errors, and encoding delay time. Accordingly, HEVC can generally support higher resolution video and improved parallel processing methods.

The HEVC video coding layer uses a "hybrid" approach, implementing inter-picture and intra-picture prediction and two dimensional (2D) transform coding. An HEVC encoder can first split a picture into block shaped regions for the first picture, or the first picture of a random access point, which uses intra-picture prediction. Intra-picture prediction as used herein can generally refer to the prediction of the blocks in the picture based only on the information in that picture. For all other pictures, inter-picture prediction is used. Inter-picture prediction can generally refer to when prediction information is used from other pictures to generate the current picture. After the prediction methods are finished and the picture goes through the loop filters, the final picture representation is stored in the decoded picture buffer. Pictures stored in the decoded picture buffer can be used for the prediction of other pictures.

The HEVC standard employs the parameter set concept. The sequence parameter set (SPS), picture parameter set (PPS), and video parameter set (VPS) mechanism in HEVC may decouple the transmission of infrequently changing information from the transmission of coded video block data.

In HEVC, an identifier of SPS picture, PPS, or VPS is coded using the variable-length encoding coding method named 'ue(v)'. The HEVC working draft defines 'ue(v)' coded syntax elements as unsigned integer Exp-Golomb-coded syntax elements with the left bit first. Each SPS includes an SPS identifier (ID), each PPS includes a PPS ID and an SPS ID, and each slice header includes a PPS ID.

Each buffering period supplemental enhancement information (SEI) message also includes an SPS ID. In general, a video coding device or a video processing device may encapsulate data of a bitstream within network abstraction layer (NAL) units. NAL units include video coding layer (VCL) NAL units and non-VCL NAL units. VCL NAL units generally include information used by a video encoder, such as coded video data and parameter sets, e.g., SPSs, PPSs, and VPSs. Non-VCL NAL units include information defining SEI messages, which may contain information that is not necessary for decoding the coded pictures samples from VCL NAL units, but may assist in processes related to decoding, display, error resilience, and other purposes.

Video Coding System

FIG. 1 is a functional block diagram of a video coding system. A video coding system ("system") 10 that may utilize methods in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, system 10 includes a source device 12 that can generate encoded video data to be decoded at a later time by a destination device 14. The source device 12 and the destination device 14 can comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

The destination device 14 may receive the encoded video data to be decoded via a link 16. The link 16 may comprise any type of medium or device capable of moving the encoded video data from the source device 12 to the destination device 14. In one example, the link 16 may comprise a communication medium to enable source device 12 to transmit encoded video data directly to the destination device 14 in real-time. The source device 12 may modulate the encoded video data according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Encoded data may be output from the output interface 22 to a storage device 34. Similarly, encoded data may be accessed from the storage device 34 by the input interface. The storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 34 may correspond to a file server or another intermediate storage device that may hold the encoded video generated by the source device 12. The destination device 14 may access stored video data from the storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 may be a streaming transmission, a download transmission, or a combination of both.

The methods of this disclosure are not necessarily limited to wireless applications or settings. The methods may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, the source device 12 includes a video source 18, video encoder 20, and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, the source device 12 and destination the device 14 may form so-called camera phones or video phones. However, the methods described in this disclosure may be applicable to video coding in general, and may be applied to wireless and/or wired applications.

The video encoder 20 may encode the captured, pre-captured, or computer-generated video. Additionally, in some embodiments, the video decoder 30 may differentiate between the first bitstream and the second bitstream based on the parameter set ID of the first bitstream and the unique parameter set ID. In other examples, output interface 22 of the source device 12 may transmit the encoded video data directly to the destination device 14 via. The encoded video data may also (or alternatively) be stored onto the storage device 34 for later access by the destination device 14 or other devices, for decoding and/or playback.

The destination device 14 includes an input interface 28, a video decoder 30, and a display device 32. In some cases, the input interface 28 may include a receiver and/or a modem. The input interface 28 of the destination device 14 receives the encoded video data over the link 16. The encoded video data communicated over the link 16, or provided on the storage device 34, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the methods are implemented partially in software, a device may store instructions for the software in a suitable, non-transitory computer-readable medium and execute the instructions in hardware using one or more processors to perform the methods of this disclosure. Each of the video encoder 20 and the video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs can be sized based on the size of PUs within a given CU defined for a partitioned LCU, although this may not always be the case. The TUs can be the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, the video encoder 20 may calculate residual values corresponding to the PU. The residual values comprise pixel difference values that may be transformed into transform coefficients, quantized, and scanned using the TUs to produce serialized transform coefficients for entropy coding. As used herein, the term "video block" may generally refer to a coding node of a CU. In some specific cases, this disclosure may also use the term "video block" to refer to a treeblock, i.e., LCU, or a CU, which includes a coding node and PUs and TUs.

A video sequence can include a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. The video encoder 20 can operate on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, the video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. The video encoder 20 may form the TUs including the residual data for the CU, and then transform the TUs to produce transform coefficients for the CU.

Following any transforms to produce transform coefficients, the video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, the video encoder 20 may utilize a predefined scan order to scan the quantized transform coefficients to produce a serialized vector that can be entropy encoded. In other examples, the video encoder 20 may perform an adaptive scan. After scanning the quantized transform coefficients to form a one-dimensional vector, the video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

To perform CABAC, the video encoder 20 may assign a context within a context model to a symbol to be transmitted. The context may relate to, for example, whether neighboring values of the symbol are non-zero or not. To perform CAVLC, the video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination can be based on a context assigned to the symbol.

Figure 2:
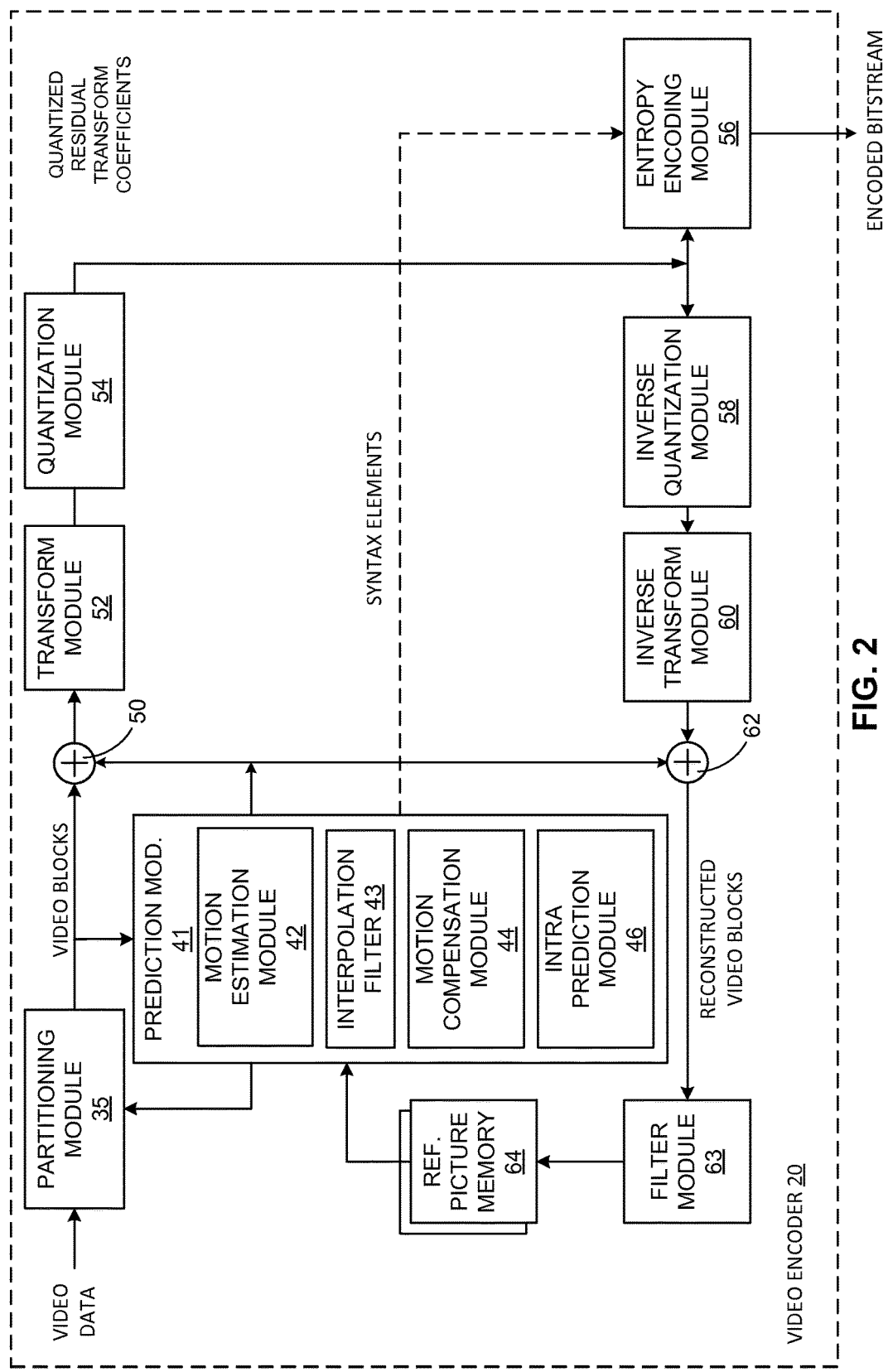
FIG. 2 is a functional block diagram of the video encoder of FIG. 1.

FIG. 2 is a functional block diagram of the video encoder of FIG. 1. The video encoder 20 can include a partitioning module 35 configured to receive captured video data and partition the video data into video blocks. The partitioning module 35 can partition the video data into slices, tiles, or other larger units. The partitioning module 35 can also partition video blocks, e.g., according to a quadtree structure of LCUs and CUs. The video encoder 20 may divide the slice into multiple video blocks (and possibly into sets of video blocks referred to as tiles).

The video encoder 20 can also have a prediction module 41 operably coupled to the partitioning module 35 and configured to receive the partitioned video data. The prediction module 41 can select one of a plurality of possible coding modes, such as one of a plurality of intra coding modes or one of a plurality of inter coding modes, for the current video block based on error results (e.g., coding rate and the level of distortion). The prediction module 41 can allow the video encoder 20 to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The prediction module 41 can include a motion estimation module 42, one or more interpolation filters 43, a motion compensation module 44, and an intra-prediction module 46. Each of these components can be operably connected or integrated in one or more processors within the video encoder 20. While discussed separately for conceptual purposes, the motion estimation module 42, the interpolation filters 43, the motion compensation module 44, and the intra-prediction module 46 can be highly integrated.

The motion estimation module 42 can be configured to determine the inter-prediction mode for a video slice according to a predetermined pattern for a video sequence. Such inter-prediction or inter-predictive coding of the current video block relative to one or more predictive blocks in one or more reference pictures can provide temporal compression. The predetermined pattern may designate video slices in the sequence as P slices, B slices or GPB slices. Motion estimation, as used herein, may generally refer to the process of generating motion vectors, which estimate motion for video blocks. A motion vector, for example, may indicate the displacement of a PU of a video block within a current video frame or picture relative to a predictive block within a reference frame or reference picture. The reference frames can be stored in a reference picture memory 64 operably coupled to the prediction module 41.

In some embodiments, the motion vector can have sub-integer pixel ("sub-pel") precision. For example, both a horizontal component and a vertical component of the motion vector may have respective full integer, or full-pel, components and sub-pel components. Such sub-pel precision can be interpolated from full-pel positions within the reference frame. As such, the terms fractional pixel, fractional pel, sub-integer, and sub-pixel motion estimation may be used interchangeably. The interpolation filters 43 can provide the interpolated positions. The interpolation filters 43 can be invoked by one or both of motion estimation module 42 and motion compensation module 44 to perform interpolation as part of motion estimation and/or motion compensation. This is described in more detail in connection with FIG. 4A and FIG. 4B below.

A predictive block is a block that is found to closely match the PU of the video block to be coded in terms of pixel difference, which may be determined by sum of absolute difference (SAD), sum of square difference (SSD), or other difference metrics. In some examples, the motion prediction module ("prediction module") 41 can calculate values for sub-integer pixel positions of reference pictures stored in the reference picture memory 64. For example, the prediction module 41 can interpolate values of one-quarter pixel positions, one-eighth pixel positions, or other fractional pixel positions of the reference picture. Therefore, the motion estimation module 42 may perform a motion search relative to the full pixel positions and fractional pixel positions and output a motion vector with fractional pixel precision.

The motion estimation module 42 can calculate a motion vector for a PU of a video block in an inter-coded slice by comparing the position of the PU to the position of a predictive block of a reference picture. The reference picture can be selected from a first reference picture list (List 0) or a second reference picture list (List 1), each of which identify one or more reference pictures stored in the reference picture memory 64. The motion estimation module 42 can send the calculated motion vector to the motion compensation module 44 and an entropy encoding module 56.

Motion compensation can involve fetching or generating the predictive block based on the motion vector determined by motion estimation. This can include interpolations (e.g., the interpolation filters 43) to sub-pixel precision. Upon receiving the motion vector for the PU of the current video block, the motion compensation module 44 can locate the predictive block to which the motion vector points in one of the reference picture lists. The motion compensation module 44 can also generate syntax elements associated with the video blocks and the video slice for use by the video decoder 30 in decoding the video blocks of the video slice.

The intra-prediction module 46 within the prediction module 41 can perform intra-predictive coding of the current video block relative to one or more neighboring blocks in the same frame or slice to provide spatial compression. The intra-prediction module 46 can intra-predict a current block, as an alternative to the inter-prediction performed by the motion estimation module 42 and the motion compensation module 44, as described above. In particular, intra-prediction module 46 may determine an intra-prediction mode to use to encode a current block. In some examples, the intra-prediction module 46 may encode a current block using various intra-prediction modes, e.g., during separate encoding passes. For example, the intra-prediction module 46 may calculate rate-distortion values using a rate-distortion analysis for the various tested intra-prediction modes, and select the intra-prediction mode having the best rate-distortion characteristics among the tested modes. Rate-distortion analysis can determine an amount of distortion (or error) between an encoded block and an original, unencoded block that was encoded to produce the encoded block, as well as a bit rate (that is, a number of bits) used to produce the encoded block. The intra-prediction module 46 may calculate ratios from the distortions and rates for the various encoded blocks to determine which intra-prediction mode exhibits the best rate-distortion value for the block.

The intra-prediction module 46 can provide information indicative of the selected intra-prediction mode for the block to the entropy encoding module 56. The entropy encoding module 56 can encode the information indicating the selected intra-prediction mode. The video encoder 20 can include configuration data in the transmitted bitstream, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After the prediction module 41 generates the predictive block for the current video block via either inter-prediction or intra-prediction, the video encoder 20 forms a residual video block by subtracting the predictive block from the current video block. This process can result in pixel difference values. The pixel difference values form the residual data for the block, and can include both luma and chroma difference components. A summer 50, operably coupled to the prediction module 41 and the partitioning module 35, represents the component or components that can be configured to perform this subtraction operation.

The residual video data in the residual block may be included in one or more TUs and applied to a transform module 52 operably coupled to the summer 50. The transform module 52 can transform the residual video data into residual transform coefficients using a transform, such as a discrete cosine transform (DCT) or a conceptually similar transform. The transform module 52 can convert the residual video data from a pixel domain to a transform domain, such as a frequency domain. The prediction module 41 can provide the resulting intra- or inter-coded block to the summer 50 to generate residual block data. The resulting intra- or inter-coded block can further be provided a summer 62 to reconstruct the encoded block for use as a reference picture.

The video encoder 20 can also include a filter module 63 operably coupled to the summer 62. The filter module 63 can represent one or more loop filters such as a deblocking filter, an adaptive loop filter (ALF), and a sample adaptive offset (SAO) filter. Although filter module 63 is shown in FIG. 2 as being an in loop filter, in other configurations, the filter module 63 can be implemented as a post loop filter. The filter module 63 can provide reference pictures to the reference picture memory 64.

The transform module 52 can send the resulting transform coefficients to a quantization module 54. The quantization module 54 can quantize the transform coefficients to further reduce bit rate. The quantization process may reduce the bit depth associated with some or all of the coefficients. The degree of quantization may be modified by adjusting a quantization parameter. In some examples, the quantization module 54 can then perform a scan of the matrix including the quantized transform coefficients. In some embodiments, the entropy encoding module 56 may perform the scan.

Following quantization, the entropy encoding module 56 can entropy encode the quantized transform coefficients. For example, the entropy encoding module 56 may perform CAVLC, CABAC, SBAC, and/or PIPE, coding or another entropy encoding methodology or method. Following the entropy encoding by the entropy encoding module 56, the encoded bitstream can be transmitted to the video decoder 30. The bitstream can also be archived for later transmission or retrieval by the video decoder 30. The entropy encoding module 56 can also entropy encode the motion vectors and the other syntax elements for the current video slice being coded.

The video encoder 20 can also include an inverse quantization module 58 operably coupled to the entropy encoding module 56. An inverse transform module 60 can also be operably coupled to the inverse quantization module 58 and the summer 62. The inverse quantization module 58 and the inverse transform module 60 can apply inverse quantization and inverse transformation, respectively, to reconstruct the residual block in the pixel domain for later use as a reference block of the reference picture. The motion compensation module 44 can calculate a reference block by adding the residual block to a predictive block of one of the reference pictures within one of the reference picture lists. The motion compensation module 44 can also apply one or more of the interpolation filters 43 to the reconstructed residual block to calculate sub-integer pixel values for use in motion estimation. The summer 62 can add the reconstructed residual block to the motion compensated prediction block produced by the motion compensation module 44 to produce a reference block for storage in the reference picture memory 64. The reference block can be used by the motion estimation module 42 and the motion compensation module 44 as a reference block to inter-predict a block in a subsequent video frame or picture.

Figure 3:
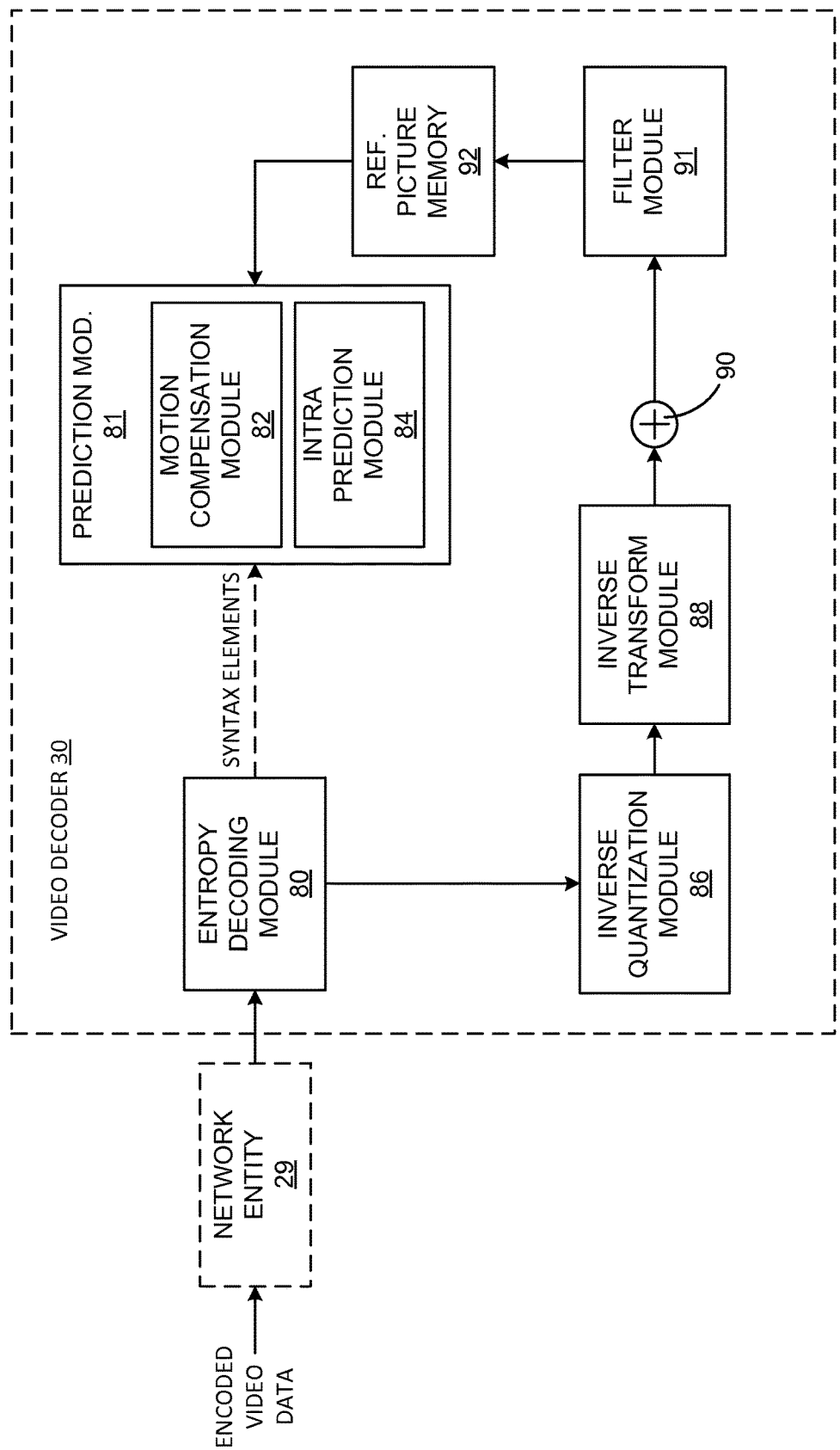
FIG. 3 is a functional block diagram of the video decoder of FIG. 1.

FIG. 3 is a functional block diagram of the video decoder of FIG. 1. The video decoder 30 can include an entropy decoding module 80, a prediction module 81, an inverse quantization module 86, an inverse transform module 88, a summer 90, a filter module 91, and a reference picture memory 92. The prediction module 81 includes a motion compensation module 82 and an intra-prediction module 84. The video decoder 30 may, in some examples, perform a decoding pass generally reciprocal to the encoding described with respect to video encoder 20 of FIG. 2.

During the decoding process, the video decoder 30 receives an encoded video bitstream that represents video blocks of an encoded video slice and associated syntax elements from the video encoder 20. The video decoder 30 may receive the encoded video bitstream from a network entity 29. The network entity 29 may, for example, be a server, a video editor/splicer, or other such device configured to implement one or more of the methods described above. As described above, some of the methods described in this disclosure may be implemented by the network entity 29 prior to the network entity 29 transmitting the encoded video bitstream to video decoder 30. In some video decoding systems, the network entity 29 and the video decoder 30 may be parts of separate devices, while in other instances, the functionality described with respect to the network entity 29 may be performed by the same device that comprises the video decoder 30.

The entropy decoding module 80 of the video decoder 30 entropy decodes the bitstream to generate quantized coefficients, motion vectors, and other syntax elements. The entropy decoding module 80 forwards the motion vectors and other syntax elements to the prediction module 81. The video decoder 30 may receive the syntax elements at the video slice level and/or the video block level.

When the video slice is coded as an intra-coded (I) slice, the intra-prediction module 84 of the prediction module 81 may generate prediction data for a video block of the current video slice based on a signaled intra-prediction mode and data from previously decoded blocks of the current frame or picture. When the video frame is coded as an inter-coded (i.e., B, P or GPB) slice, the motion compensation module 82 of the prediction module 81 produces predictive blocks for a video block of the current video slice based on the motion vectors and other syntax elements received from the entropy decoding module 80. The predictive blocks may be produced from one of the reference pictures within one of the reference picture lists. The video decoder 30 may construct the reference frame lists, List 0 and List 1, using default construction methods based on reference pictures stored in the reference picture memory 92.

The motion compensation module 82 determines prediction information for a video block of the current video slice by parsing the motion vectors and other syntax elements, and uses the prediction information to produce the predictive blocks for the current video block being decoded. For example, the motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

The motion compensation module 82 may also perform interpolation based on interpolation filters (not shown in this figure). In some embodiments, the interpolation filters within the video decoder 30 can be similar to the interpolation filters 43 (FIG. 2). The motion compensation module 82 may use interpolation filters to calculate interpolated values for sub-integer pixels or sub-pel positions within certain reference blocks. In some embodiments, the motion compensation module 82 can determine which interpolation filters used by the video encoder 20 via the received syntax elements and use the same or similar interpolation filters 43 to produce predictive blocks.

The inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. The inverse transform module 88 applies an inverse transform, e.g., an inverse DCT, an inverse integer transform, or a conceptually similar inverse transform process, to the transform coefficients in order to produce residual blocks in the pixel domain.

After the motion compensation module 82 generates the predictive block for the current video block based on the motion vectors and other syntax elements, the video decoder 30 can form a decoded video block by summing the residual blocks from the inverse transform module 88 with the corresponding predictive blocks generated by motion compensation module 82. The summer 90 can represent the component or components that perform this summation operation. If desired, loop filters (either in the coding loop or after the coding loop) may also be used to smooth pixel transitions, or otherwise improve the video quality. The filter module 91 is intended to represent one or more loop filters such as a deblocking filter, an adaptive loop filter (ALF), and a sample adaptive offset (SAO) filter. Although the filter module 91 is depicted as an in-loop filter, in some embodiments, the filter module 91 may be implemented as a post loop filter. The decoded video blocks in a given frame or picture are then stored in the reference picture memory 92, which stores reference pictures used for subsequent motion compensation. The reference picture memory 92 also stores decoded video for later presentation on a display device, such as the display device 32 of FIG. 3.

Figure 4A:
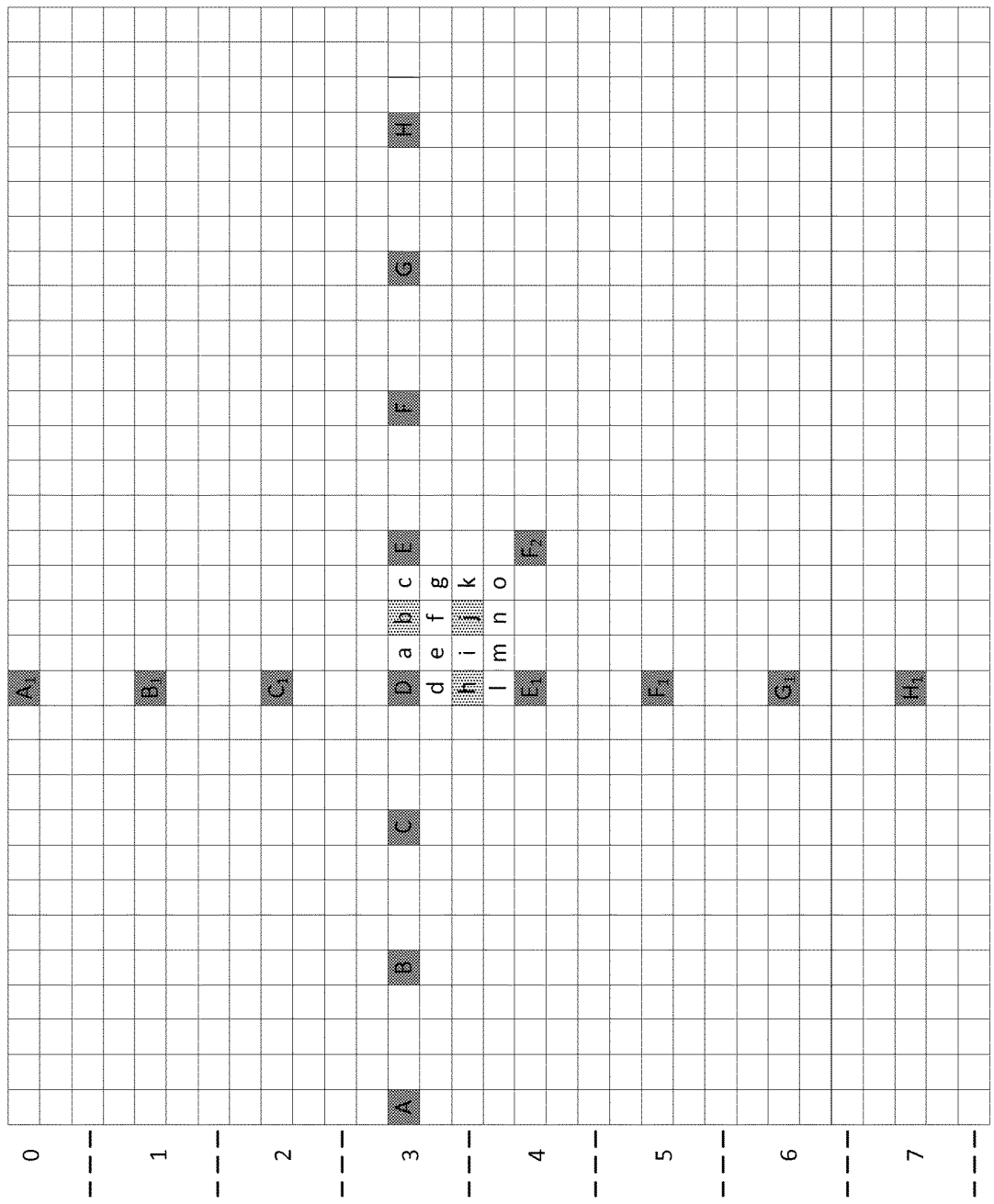
FIG. 4A is a graphical representation of a reference frame for motion search.

FIG. 4A is a graphical representation of a reference frame for motion search. A reference frame 400 is shown as an 8×8 pixel block of video data. The dimensions of the reference frame 400 can be larger than 8×8, in certain embodiments. Accordingly, the dimensions are for description purposes and should not be considered limiting. The reference frame 400 can thus have 64 pixels (8 by 8). Each of the individual pixels can further be split into 4×4 sub-pixels, as shown. Each of the squares within the reference frame 400 indicates a full-pel or sub-pel position. The reference frame 400 shows full-pel positions with capital letters "A-H" and "A1-H1," colored gray. Sub-pel positions are indicated with a lower-case letters "a-o." The sub-pel positions b, h, and j, colored light gray, represent half-pel positions. The sub-pel positions a, c, d, e, f, g, i, k, 1, m, n, and o, all colored white, represent quarter-pel (Q-pel) positions. While only a portion the positions within the reference frame 400 are labeled, it is to be understood that the labeling convention and the relationships from full-pel to sub-pel positions can be repeated throughout the reference frame 400.

The following description is provided in terms of the prediction module 41 and the motion estimation module 42 (FIG. 2) at the video encoder 20. However, in some embodiments, the following description can also apply to the prediction module 81, and the motion compensation module 82 at the video decoder 30 (FIG. 3).

The motion estimation module 42 can perform a motion search for the current frame (described below in connection with FIG. 4B) relative to the full-pel and sub-pel positions of the reference frame 400. Depending on the resolution and accuracy of the motion search, the motion estimation module 42 can output a motion vector with fractional pixel precision using the full-pel (e.g., blocks A-H and A1-H) and sub-pel positions (a-o) as a reference. In fractional pixel motion estimation, the motion estimation module 42 can calculate a motion vector that indicates displacement to a location other than the full-pel positions. Thus, the motion vector may have fractional pixel precision, e.g., one-half-pixel precision, one-quarter pixel precision, one-eighth pixel precision, or other fractional pixel precisions. Accordingly, fractional pixel motion estimation allows the prediction module 41 to estimate motion with higher precision than integer-pixel (or full-pixel) locations, and thus, the prediction module 41 can generate a more accurate prediction block.

Sub-pel motion search can be important to achieving desirable compression ratios and increased resolution for motion estimation. However, computation complexity can be relatively high since the motion estimation module 42 may demand significant resources for interpolation filtering by, for example, the interpolation filters 43, for sub-pel (e.g., half-pel, quarter-pel) prediction. To reduce computation complexity, a refinement search can be applied. During the refinement search, the video encoder 20 can apply sub-pel motion searches to refine the full-pel motion. Full-pel motion can be obtained via a motion search algorithm on the reference frame 400 (e.g., stored in the reference picture memory 64) without interpolating sub-pel positions. Once the full-pel positions are obtained, neighboring sub-pel positions can be resolved to refine signal and motion prediction. In some embodiments, interpolation filters 43 can be configured to apply at least two stages of refinement. A first stage can be a half-pel interpolation, centered at the full-pel position, and the second can be a Q-pel interpolation, centered at the half-pel position.

In HEVC, for example, the Q-pel interpolation process can be implemented with two 1-D interpolation processes (e.g., horizontal and vertical). This would produce, for example, the Q-pel positions a, c, d, e, f, g, i, k, l, m, n, and o of the frame 400. If the input is an 8-bit representation of the full-pel position, the output of the first 1-D interpolation (and the input of the second 1-D interpolation) can be more than 8 bits, (e.g., 16-bits). Thus, in some embodiments memory can accommodate storage of the 16-bit input. In some other embodiments, the storage can be larger. Because the precision can be doubled, the second interpolation can be twice the complexity of the first interpolation (e.g., input bit precision from 8 bits to 16 bits), even though the first interpolation can require more samples for the process. For example, the first interpolation may have eight more rows or columns. In some embodiments, the interpolation filters can output a precision that is less than 16 bits, in which case the storage is also less than 16-bit. In some other embodiments, the precision can be artificially truncated to be less than 16 bits and then pack the data.

In some embodiments, sub-pel position interpolation allows the video encoder 20 to pre-calculate and store the entire reference frame 400 in memory (e.g., the memory 34 or the reference picture memory 64) to reduce computation requirements. This can be beneficial as each sub-pel position might be accessed several times during mode decision and motion search for each block in the current frame. However, the speed of the video encoder 20 can suffer from increased memory usage by storing the interpolated positions. Thus, in some embodiments, the video encoder 20 may only store the half-pel (H-pel) positions in the memory 34. This can provide a tradeoff between higher memory usage and lower computation requirements. Q-pel positions can then be calculated (e.g., interpolated) when needed from the stored half-pel positions.

In some embodiments, the motion estimation module 42 can perform interpolation for a motion solution with an 8-bit input. The processing can include the use of 16- or 32-bit solutions, but the output can be truncated to 8 bits, as in, for example, HEVC.

In some embodiments, the most direct, or least complicated, way to obtain Q-pel positions a, c, d, and l, can be to apply a horizontal or vertical interpolation filter 43 on the full-pel position, D (with filter support of 8 full-pel pixels A-H). This can derive the half-pel position(s) b, within the reference frame 400. If the motion estimation module 42 begins the interpolation process with horizontal interpolation filter 43, a vertical interpolation filter 43 can follow to derive the remaining half-pel positions h and j and the Q-pel positions (e.g., from the half-pel positions). For example, the positions e, i, and m can be derived from a vertical interpolation filter using Q-pel position a. Additionally, positions f and n can be derived from a vertical interpolation filter 43 using position b, and positions g, k, and o can be derived from a vertical interpolation filter 43 using position c. Temporary data derived at position a and position c can be stored within the storage device 34 before applying vertical filtering. In some embodiments, the temporary data can be stored in 8-bits or 16-bits, depending on the design of the interpolation filter 43. In some cases, as noted above, when the precision is greater than allowed by the storage.

However, if the interpolation process begins with a vertical interpolation filter 43, followed by a horizontal interpolation filter 43, the positions e, f, and g can be derived from position d; positions i and k can be derived from position h; and positions m, n, o can be derived from position l. Temporary data at position d and position l can be stored in 8 or 16-bits before applying horizontal filtering.

In some embodiments, this second approach (e.g., vertical and then horizontal interpolation), combined with sub-sampled error measurement can further reduce the complexity of motion search and the resulting computation. In subsampled error measurement, only every other row of data within the reference frame 400 is used to measure prediction error. Therefore, the video encoder 20 can further reduce the computation on error measurement and reduce the requirements to repeatedly access the memory 64 to retrieve sub-pel position information.

Figure 4B:
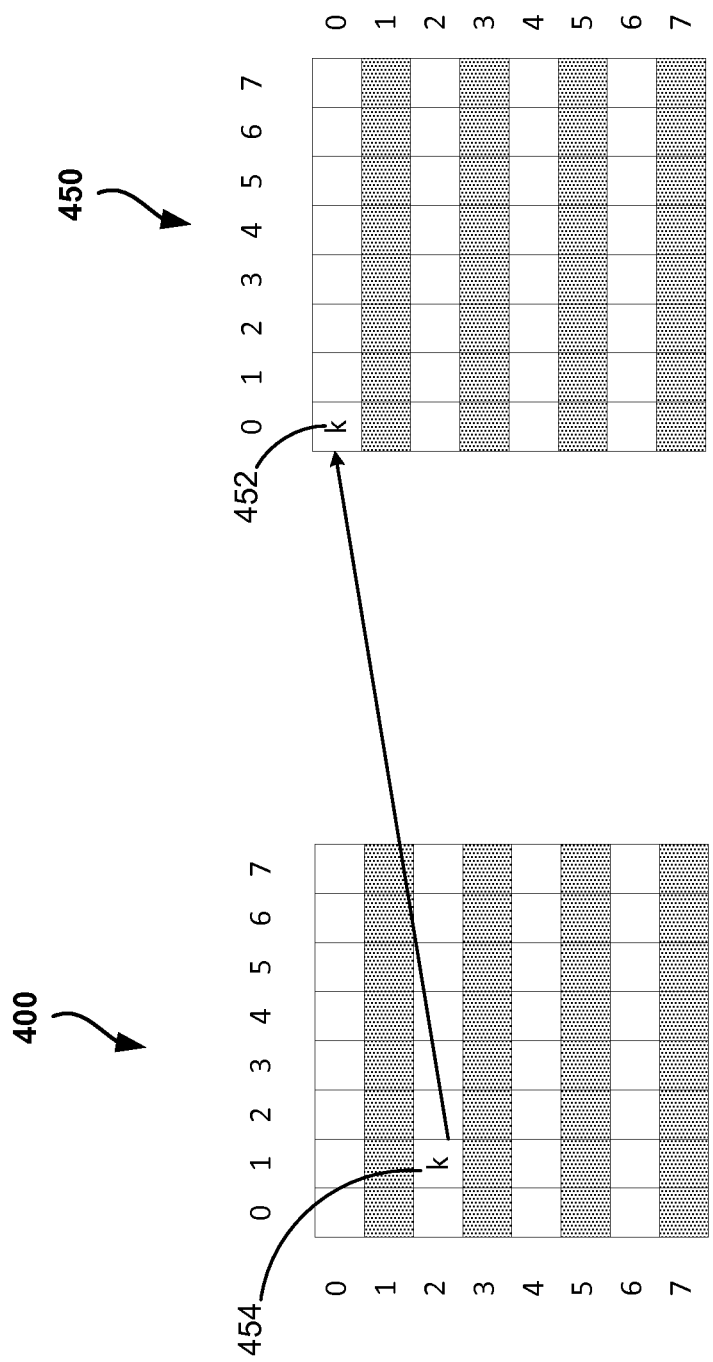
FIG. 4B is a graphical representation of a coded video data frame and a reference frame during motion search.

FIG. 4B is a graphical representation of motion estimation using subsample error measurement. A current frame 450 can be encoded by the video encoder 20, using the reference frame 400 (FIG. 4A) for motion estimation. The reference frame 400 is similar to that described above however the sub-pel position information is not depicted. As encoding of the current frame 450 proceeds, the motion estimation module 42 can use full-pel or sub-pel positions from the reference frame 400 for motion estimation.

The current frame 450 is depicted as an 8×8 pixel block of video data, similar to the reference frame 400. The current frame 450 can be a portion of a larger frame of video, thus the 8×8 pixel depiction should not be considered limiting. The size of the current frame 450 can also be a larger frame such as 16×16, 32×32, 64×64 pixels, or larger as needed for encoding the current frame 450 in HEVC, for example. The current frame 450 can also be asymmetrical as required. In some embodiments, each of the blocks in the current frame 450 can represent a full-pel position or a sub-pel position.

In some embodiments, the video encoder 20 can use subsampled error measurement to reduce computation complexity. Subsampled error measurement can make use of every other row of video data in the reference frame 400 and the current frame 450 to measure or otherwise determine prediction error. In such an embodiment, the motion estimation module 42 can first apply the vertical interpolation filter 43 to the video data. The horizontal interpolation filter 43 can follow, using subsampled error measurement on every other vertically interpolated row (e.g., the row 0, row 2, row 4, and row 6). Due to the implementation of the subsampled error measurement, only every other row of video data within the reference frame 400 is needed for motion search during the horizontal interpolation, reducing computation complexity. Similarly, only every other row of the current frame 450 may be used for motion estimation.

In some other embodiments, the motion estimation module 42 can implement additional instructions (at the video encoder 20) to only regard every other row during vertical interpolation. Horizontal interpolation can follow. Therefore, the vertical interpolation filter 43 can be applied to every other row of data, followed by the horizontal interpolation filter 43 on the positions derived from the vertical interpolation. Accordingly, computation can be reduced by half during horizontal interpolation filtering if vertical interpolation filtering is applied first.

In one example, the video encoder 20 can encode the current frame 450 pixel by pixel starting in the upper left pixel "k," of the current frame 450, also referred to herein as pixel 452. The motion estimation module 42 can use the reference frame 400 to generate the motion vector for the pixel 452 using the collocated pixel in the reference frame 400 that most closely matches the pixel 452. As shown, a collocated pixel 454 is found in row 2, column 1. The motion estimation module 42 can then determine a motion vector based on the difference between the positions of the closest matching block 454 and the block 452. In the illustrated example, the motion vector can be (−2, −1). In some embodiments the collocated pixel 454 can be a full-pel or a sub-pel position.

In some embodiments, as the motion estimation module 42 conducts the motion search, the video encoder 20 need only interpolate every other row of the reference frame 400 because of the subsampled error measurement. The interpolated pixel positions are indicated by the white squares. The gray squares indicate the positions that are not interpolated, or may otherwise be ignored for purposes of the motion search. Referring briefly back to FIG. 4A, in some embodiments, this can correspond to omitting the interpolation of the rows (and corresponding sub-pel positions) 1, 3, 5, and 7. Thus, the video encoder 20 can use the rows 0, 2, 4, and 6 for motion estimation, as shown in FIG. 4B.

In some embodiments, the motion estimation module 42 may only regard every other row within the current frame 450 for the motion search. The rows that the encoder considers for the motion search are shown in white blocks, similar to the reference frame 400. Due to the use of every other row of video data in the reference frame 400, the number of interpolations and the associated computations are reduced. This can result in certain trade-offs between decreases in computation complexity and coding efficiency.

Table 1 below indicates how many 8-bit interpolations may be needed to obtain a PU having a size of X by Y. If not simplified, the video decoder 30 can act on the encoded data directly. The complexity can be dominated by 16 bit interpolation, or two 8-bit interpolations. For example, in rows (1) and (2) for the encoder or decoder, for a smallest PU (e.g., X=8 and Y=4), the computation to resolve positions e, g, m, and o is $(8+7)*4+8*4*2=124$. If, as shown in row (3), for example, a vertical interpolation filter is applied before the horizontal interpolation filter and with subsampling during horizontal interpolation, the computation can be reduced to $(8+7)*4+8*4/2=76$. It should be noted that row (3) indicates computation complexity without vertical subsampling instructions to the prediction module 41. For example, sub-pel positions for every row can be calculated during vertical interpolation, but half of the calculated positions (e.g., the every other row) may be disregarded when conducting horizontal interpolation on every other row.

TABLE 1

Computations for interpolation of sub-pel positions (with half-pel position pre-calculated and stored)

| | a, c | d, l | f, n | i, k | e, g | m, o |
|---|---|---|---|---|---|---|
| (1) Decoder | X * Y | X * Y | (X + 7) * Y + X * Y * 2 | (X + 7) * Y + X * Y * 2 | (X + 7) * Y + X * Y * 2 | (X + 7) * Y + X * Y * 2 |
| (2) Encoder without subsample | X * Y | X * Y | X * Y | X * Y | (X + 7) * Y + X * Y | (X + 7) * Y + X * Y |
| (3) Encoder with subsample (without vertical subsample instruction) | X * Y/2 | X * Y | X * Y | X * Y/2 | (X + 7) * Y + X * Y/2 | (X + 7) * Y + X * Y/2 |

TABLE 1-continued

Computations for interpolation of sub-pel positions (with half-pel position pre-calculated and stored)

| | a, c | d, l | f, n | i, k | e, g | m, o |
|---|---|---|---|---|---|---|
| (4) Encoder with subsample (with vertical subsample instruction) | X * Y/2 | X * Y/2 | X * Y/2 | X * Y/2 | ((X + 7) * Y + X * Y)/2 | ((X + 7) * Y + X * Y)/2 |

Additionally, the prediction module 41 can apply refinement searches centered at one of the full-pel or half-pel positions in order better resolve predictions for the 8 Q-pel neighbors. Accordingly, the prediction module 41 can store the first 1-D interpolation in the storage device 34 and can reference the storage device 34 for up to three additional Q-pel positions. For example, the positions e, f, and g can all be derived from position d. Therefore, the Q-pel motion search can be started at position j, and computation is reduced from $(X+7)*Y*3+(X*Y*2*8)$ to $(X+7)*Y*2+(X*Y/2)*8$.

To further reduce the complexity in the subsample case, the Q-pel positions m, o, e, and g can be computed differently if the search is started at positions b and j. In some embodiments, instead of deriving Q-pel positions m and o from position l, and deriving Q-pel position e and g from position d, the positions m and o can be derived from position n, and positions e and g can be derived from position f. As a result, computation can be reduced by $(X+7)*Y*2$, as shown in row (3).

In some embodiments, additional vertical subsample instructions can be included. With such vertical subsample instructions, the prediction module 41 can perform vertical interpolation on every other row (as opposed to every row as in row (3)) and further reduce the calculations as shown in row (4). This is shown for positions a, c, d, l, f, n (X*Y/2), for example. Thus, sub-pel positions for every other row are interpolated (vertical interpolation) and then the calculated positions for every other row can be used during horizontal interpolation.

Figure 5:
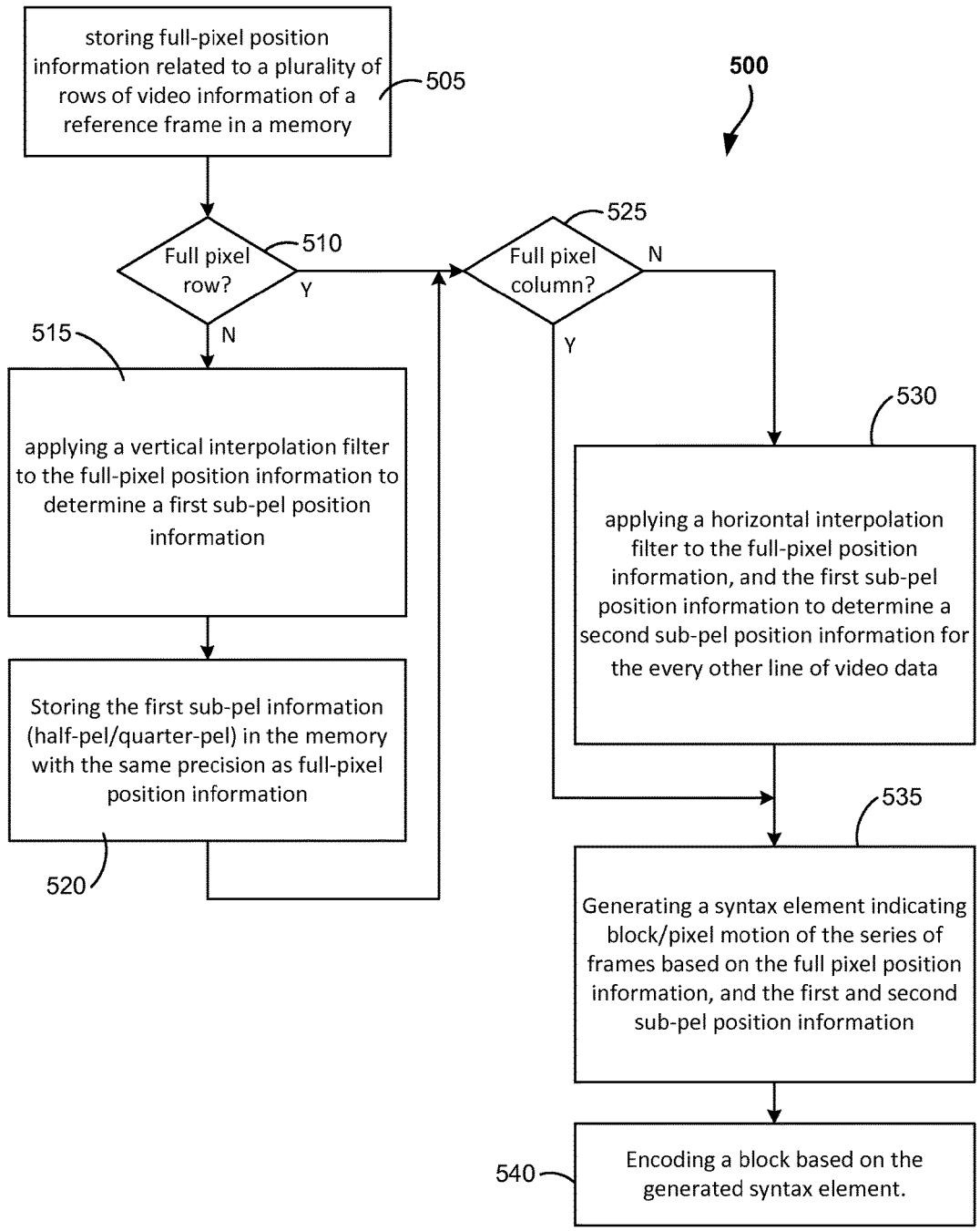
FIG. 5 is a flowchart illustrating a method of motion search.

FIG. 5 is a flowchart illustrating an embodiment of a method of motion search. A method 500 can be used at the motion estimation module 42 for a sub-pel motion search to derive half-pel and Q-pel position information for the reference frame 400 to be encoded. The method 500 can start at step 505 when the prediction module 41 can store the full-pixel position information related to a series of video frames in the storage device 34. The full-pixel position information can be related to the video data received by the video encoder 20 and can further include the reference frame 400 (FIG. 4A and FIG. 4B).

At decision step 510 the motion estimation module 42 can determine whether the searched position (half-pel, Q-pel) is located on a row of the reference frame 400 having full pixel positions (a "full-pel row") saved at step 505. For example, referring to the reference frame 400 of FIG. 4A, the half-pel position b is located on a full-pel row with the full-pel position D and E, among others. If the motion estimation module 42 is searching for the positions h, i, j, and k, for instance, these half-pel and Q-pel positions are not on a full-pel row. If the video encoder 20 determines that the searched position is not on a full-pel row, the method 500 proceeds to step 515. At step 515 the motion estimation module 42 can apply a vertical interpolation filter 43 to the full-pixel position information (e.g., the positions D, E, $E_1$, and $F_1$) to determine a first sub-pel position information. In some embodiments, the motion estimation module 42 can further apply the vertical interpolation filter 43 to every other row of the full-pixel position information (e.g., subsample error measurement). This can reduce computation complexity as noted above in Table 1, but may require additional instructions (e.g., row (4) of Table 1). The sub-pel position information can be a first quarter-pixel position information or a first half-pixel position information for every other line or row of video information related to the reference frame 400 or the series of frames.

At step 520, the motion estimation module 42 can store the first sub-pel position information in the memory (e.g., the storage device 34) with the same precision as full-pixel position information in step 505.

Returning to step 510, if the search is conducted on the full pixel row, or following step 520, the method 500 can move to decision step 525.

At the decision step 525, the motion estimation module 42 can determine whether the searched position is in a full pixel column. For example, similar above in the step 515, the sub-pel positions a, e, i, and m are not in a full pixel column in the same way than the sub-pel positions d, h, and l are. Accordingly, at step 530, if the searched position is not in the full pixel column, the motion estimation module 42 can apply a horizontal interpolation filter to the full-pixel position information, the first sub-pel position information to determine a second sub-pel position information. The second sub-pel position information can be a second quarter-pixel position information or a second half-pixel position information for the every other line of video information. Thus, the motion estimation module 42 can reduce the computations by one half by implementing the subsample error measurement because the horizontal interpolations are conducted on every other row of video data. The rows not regarded during the horizontal interpolation can be disregarded. If, as noted above, the vertical interpolation filter 43 is applied to every other row of full-pixel position information at step 515, then the computations are further reduced as noted in row (4) of Table 1.

At decision step 525 if the searched position is on the full-pixel column, or after step 530, the method 500 moves to step 535.

At step 535, the prediction module can generate a syntax element indicating block/pixel motion of the series of frames based on the full-pixel position information and/or first and second sub-pel position information. As noted above, the sub-pel position information can be at least half-pel or Q-pel position information.

At step 540, the video encoder 20 can then encode a block of video data based on the syntax element generated in step 535.

Information and signals disclosed herein may be represented using any of a variety of different technologies and methods. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The embodiments described herein may be implemented in hardware, software, firmware, or any combination thereof. Such embodiments may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods and processes described in this disclosure. A general purpose processor may be a microprocessor; but in the alternative, the processor may be a processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein. In addition, in some aspects, the functionality described herein may be provided within dedicated software modules or hardware modules configured for encoding and decoding, or incorporated in a combined video encoder-decoder (CODEC).

Although embodiments of the disclosure are described above for particular embodiment, many variations of the disclosure are possible. For example, the numbers of various components may be increased or decreased, modules and steps that determine a supply voltage may be modified to determine a frequency, another system parameter, or a combination of parameters. Additionally, features of the various embodiments may be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The above description of the disclosed embodiment is provided to enable any person skilled in the art to make or use the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method of encoding video data, comprising:
storing full-pixel position information related to a plurality of rows of video information of a reference frame in a memory;
applying a vertical interpolation filter to the full-pixel position information for video information related to the reference frame to determine a first sub-pel position information only in response to determining a searched position is not located on a full-pixel row within the reference frame;
for only every other row of the full-pixel position information, applying a horizontal interpolation filter to the full-pixel position information of the every other row and the first sub-pel position information to determine a second sub-pel position information for the every other row of video information only in response to determining the searched position is not located on a full-pixel column within the reference frame, wherein every other row comprises less than all rows;

generating a syntax element indicating pixel motion of a current frame based on the every other row of full-pixel position information, the first sub-pel position information, and the second sub-pel position information; and encoding a block based on the generated syntax element.

2. The method of claim 1, further comprising storing the first sub-pel position information in the memory before applying the horizontal interpolation filter.

3. The method of claim 1, further comprising, applying the vertical interpolation filter only to every other row of video information related to the reference frame.

4. The method of claim 2, further comprising:
precalculating a plurality of half-pel positions related to the reference frame based on the full-pixel position information stored in the memory; and
storing half-pel position information related to the half-pel positions in the memory.

5. A method of encoding video data, comprising:
storing full-pixel position information related to a reference frame in a memory;
only when a searched position is not located on a full-pixel row within the reference frame:
for only every other row of the full-pixel position information, applying a vertical interpolation filter to the full-pixel position information of the every other row for video information related to the reference frame to determine a first sub-pel position information, wherein the every other row comprises less than all rows, and
storing the first sub-pel position information in the memory;
only when a searched position is not located on a full-pixel column within the reference frame:
applying a horizontal interpolation filter to the full-pixel position information and the first sub-pel position information to determine a second sub-pel position information for the every other row of video information;
generating a syntax element indicating pixel motion of a current frame based on the every other row of the full-pixel position information, the first sub-pel position information, and the second sub-pel position information; and
encoding a block based on the generated syntax element.

6. The method of claim 5, further comprising:
precalculating a plurality of half-pel positions related to the reference frame based on the full-pixel position information stored in the memory; and
storing half-pel position information related to the half-pel positions in the memory.

7. The method of claim 6, wherein storing the half-pel position information occurs before applying the vertical interpolation filter.

8. The method of claim 5, wherein the first and second sub-pel position information comprise half-pel position information, the half-pel position information indicating a half-pel position located halfway between two adjacent full-pixel positions.

9. The method of claim 5, wherein the first and second sub-pel position information comprise quarter-pel position information, the quarter-pel position information indicating a quarter-pel position located halfway between a half-pel position and an adjacent full-pixel position.

10. The method of claim 5, wherein the first and second sub-pel position information are stored in the memory with the same number of bits as full-pixel position information.

11. The method of claim 5, wherein pixel motion between the reference frame and the current frame is indicated by a vector, the vector referencing at least one of the first sub-pel position information and the second sub-pel position information.

12. The method of claim 5, further comprising generating the syntax element indicating pixel motion of the current frame based on the full pixel position information when the searched position is located on a full-pixel row within the reference frame.

13. The method of claim 5, further comprising generating the syntax element indicating pixel motion of the current frame based on the full-pixel position information when the searched searched position is located on a full-pixel column within the reference frame.

14. A device for encoding video, comprising:
a memory configured to store full-pixel position information related to a series of frames in a memory for motion search;
a processor operably coupled to the memory and configured to:
only in response to determining a searched position is not located on a full-pixel row of a reference frame, apply a vertical interpolation filter to the full-pixel position information for video information related to the series of frames to determine a first sub-pel position information for the video information,
store the first sub-pel position information in the memory,
only in response to determining a searched position is not located on a full-pixel column of the reference frame, for only every other row of the full-pixel position information, apply a horizontal interpolation filter to the full-pixel position information of the every other row and the first sub-pel position information to determine a second sub-pel position information for the every other row of video information, wherein the every other row comprises less than all rows,
generate a syntax element indicating pixel motion of the series of frames based on the full-pixel position information, the first sub-pel position information and second sub-pel position information, and
encode a block based on the generated syntax element.

15. The device of claim 14, wherein the processor is further configured to apply the vertical interpolation filter only to every other row of video information related to the reference frame to determine the first sub-pel position information for the video information.

16. The device of claim 14, wherein the processor is further configured to:
precalculate half-pel position information related to the reference frame based on the full-pixel position information stored in the memory; and
store the half-pel position information in the memory, the half-pel position information being related to a plurality of half-pel positions.

17. The device of claim 16, wherein the processor is configured to store the half-pel position information before applying the vertical interpolation filter.

18. The device of claim 14, wherein the first and second sub-pel position information comprise half-pel position information, the half-pel position information indicating a half-pel position located halfway between two adjacent full-pixel positions.

19. The device of claim 14, wherein the first and second sub-pel position information comprise quarter-pel position information, the quarter-pel position information indicating a quarter-pel position located halfway between a half-pel position and an adjacent full-pixel position.

20. The device of claim 14, wherein the first and second sub-pel position information are stored in the memory with the same number of bits as full-pixel position information.

21. The device of claim 14, wherein pixel motion between the reference frame and the current frame is indicated by a vector, the vector referencing at least one of the first sub-pel position and the second sub-pel position information.

22. An apparatus for encoding video data, comprising:
a storage means configured to store full-pixel position information related to a series of frames in a memory for motion search;
a processing means operably coupled to the storage means and configured to:
apply a vertical interpolation filter to the full-pixel position information only when a searched position is not located on a full-pixel row of a reference frame, to determine a first sub-pixel position information related to the series of frames,
store the first sub-pel position information in the memory, and
for only every other row of the full-pixel position information, apply a horizontal interpolation filter to the full-pixel position information of the every other row and the first sub-pel position information only when a searched position is not located on a full-pixel column of the reference frame, to determine a second sub-pel position information for the every other line of video information, wherein the every other row comprises less than all rows;
a generation means for generating a syntax element indicating pixel motion of the series of frames based on the full-pixel position information, first and second half-pixel position information, or first and second quarter-pixel position information; and
an encoding means configured to encode a block based on the generated syntax element.

23. The apparatus of claim 22, wherein storage means comprises a memory and the processing means comprises a one or more processors.

24. The apparatus of claim 22, wherein the processing means is further configured to precalculate a plurality of half-pel positions related to the reference frame based on the full-pixel position information stored in the memory.

25. The apparatus of claim 23 wherein the storage means is further configured to store the half-pel position information related to the half-pel positions.

26. The apparatus of claim 22, wherein the first and second sub-pel position information comprise half-pel position information, the half-pel position being located halfway between two adjacent full-pixel positions.

27. The apparatus of claim 22, wherein the first and second sub-pel position information comprise quarter-pel position information, the quarter-pel position information indicating a quarter-pel position located halfway between a half-pel position and an adjacent full-pixel position.

28. The apparatus of claim 22, wherein the first and second sub-pel position information are stored in the memory with the same number of bits as full-pixel position information.

29. The apparatus of claim 22, wherein pixel motion between the reference frame and the current frame is indicated by a vector, the vector referencing at least one of the first sub-pel position and the second sub-pel position information.

30. The apparatus of claim 22, wherein the processing means is further configured to apply the vertical interpolation filter only to every other row of the full-pixel position information.

* * * * *